(12) United States Patent
Chen et al.

(10) Patent No.: US 7,378,785 B2
(45) Date of Patent: May 27, 2008

(54) POLARIZING PHOTONIC BAND GAP SYSTEM WITH REFLECTOR

(75) Inventors: Chien-Hua Chen, Corvallis, OR (US); Murali Chaparala, Vancouver, WA (US); Robert Bicknell, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 10/819,158

(22) Filed: Apr. 7, 2004

(65) Prior Publication Data

US 2005/0225223 A1 Oct. 13, 2005

(51) Int. Cl.
*H01J 5/16* (2006.01)
(52) U.S. Cl. .................... 313/112; 313/110
(58) Field of Classification Search ........ 313/110–111, 313/112; 349/61, 69; 428/690
See application file for complete search history.

(56) References Cited

U.S. PATENT DOCUMENTS

| 4,386,826 | A | * | 6/1983 | Stolov ................... 349/68 |
| 4,398,805 | A | * | 8/1983 | Cole ..................... 349/68 |
| 6,188,481 | B1 | * | 2/2001 | Kumar .................. 356/489 |
| 6,234,634 | B1 | * | 5/2001 | Hansen et al. ............ 353/20 |
| 6,611,085 | B1 | * | 8/2003 | Gee et al. ............... 313/271 |

* cited by examiner

*Primary Examiner*—Joseph L. Williams
*Assistant Examiner*—Hana A Sanei (57) ABSTRACT

A polarizing photonic band gap system has a photonic crystal emitter. The photonic crystal emitter has a crystal end surface. The photonic crystal emitter is configured to generate electromagnetic energy having a wavelength $\lambda$. The system has a polarizer. The polarizer is connected to the photonic crystal emitter. The polarizer has a polarizer surface. The polarizer surface is located within a distance of said crystal end surface. The distance is sufficient to quantum mechanically couple the polarizer surface with said crystal end surface at the wavelength $\lambda$.

33 Claims, 7 Drawing Sheets

POLARIZING PHOTONIC BAND GAP SYSTEM WITH REFLECTOR

BACKGROUND OF THE INVENTION

Many current display devices (such as liquid crystal displays (LCD) or liquid-crystal-on-silicon (LCOs)) are based on polarization of light. For example, randomly oriented light may be first polarized through a first polarizer. Then, the polarized light may pass through a liquid crystal film (a "pixel array") having pixels that can individually and selectively rotate the polarization of light passing therethrough depending on a control voltage applied thereto. Then, the selectively polarized light from the pixel array passes through a second polarizer (which is often called an "analyzer," and may be designated as such herein) such that the ratio of light that is transmitted through the analyzer (for each pixel) depends on the selective polarization rotation imparted by each pixel in the pixel array.

One problem with the current technology is that most or all of the non-transmitted light (due to the first polarizer) does not get re-transmitted through the first polarizer, thus reducing the total efficiency of the system. Another problem with the current technology is that the first polarizer is manufactured in a different process—and often in a different factory across the world—than the light source (such as an incandescent lamp), and the light source must be mated to the other elements of the display in a costly additional step.

SUMMARY OF THE INVENTION

The present invention aims to solve at least one of these and other problems.

According to an embodiment, a polarizing photonic band gap system comprises: a photonic crystal emitter having a crystal end surface, the photonic crystal emitter configured to generate electromagnetic energy having a wavelength $\lambda$; and a polarizer connected to said photonic crystal emitter and having a polarizer surface located within a distance of said crystal end surface sufficient to quantum mechanically couple with said crystal end surface at said wavelength $\lambda$.

DETAILED DESCRIPTION OF PREFERRED EMBODIMENTS

Photonic crystals are well known in the art. Photonic crystals, also known as photonic band-gap materials, are materials that have optical band gaps analogous to electronic band gaps in semiconductors. Photonic crystals may comprise periodically arranged nanostructures in a matrix of a dielectric having a permittivity different from that of the nanostructures. For example, photonic crystals may be formed by periodically arranging cylinders, parallelepipeds, or other such structures in air, by creating periodically arranged air or vacuum holes in a dielectric substrate, by creating a colloid of nanometer-sized spheres of a dielectric in a matrix, and so forth. Photonic crystals are often formed of dielectric materials, such as glass, silicon, metal oxides, etc., but may also be formed of metals, including but not limited to aluminum and tungsten. These examples are not meant to limit the scope of the present invention, rather to provide examples for clarification. The scope of the present invention includes photonic crystals of any shape, form, build, composition, and design.

Polarizing devices are also well known in the art. A polarizer is a device that aligns the polarization orientation of photons passing through, such as by absorbing and/or reflecting those photons whose polarization orientation is perpendicular to the polarization orientation of photons passing through the polarizer. Polarizers, as referred to in the present application, may include, but are not limited to, wire grid polarizers, diffractive polarizers, prism polarizers, nano-scale polarizers, self-assembled nano-crystal films, etc. Wire grid polarizers are also well known in the art.

Liquid crystal displays, such as those incorporating a liquid crystal that rotates the polarization orientation of light up to 90° depending upon an applied voltage, are well known in the art.

Figure 1:
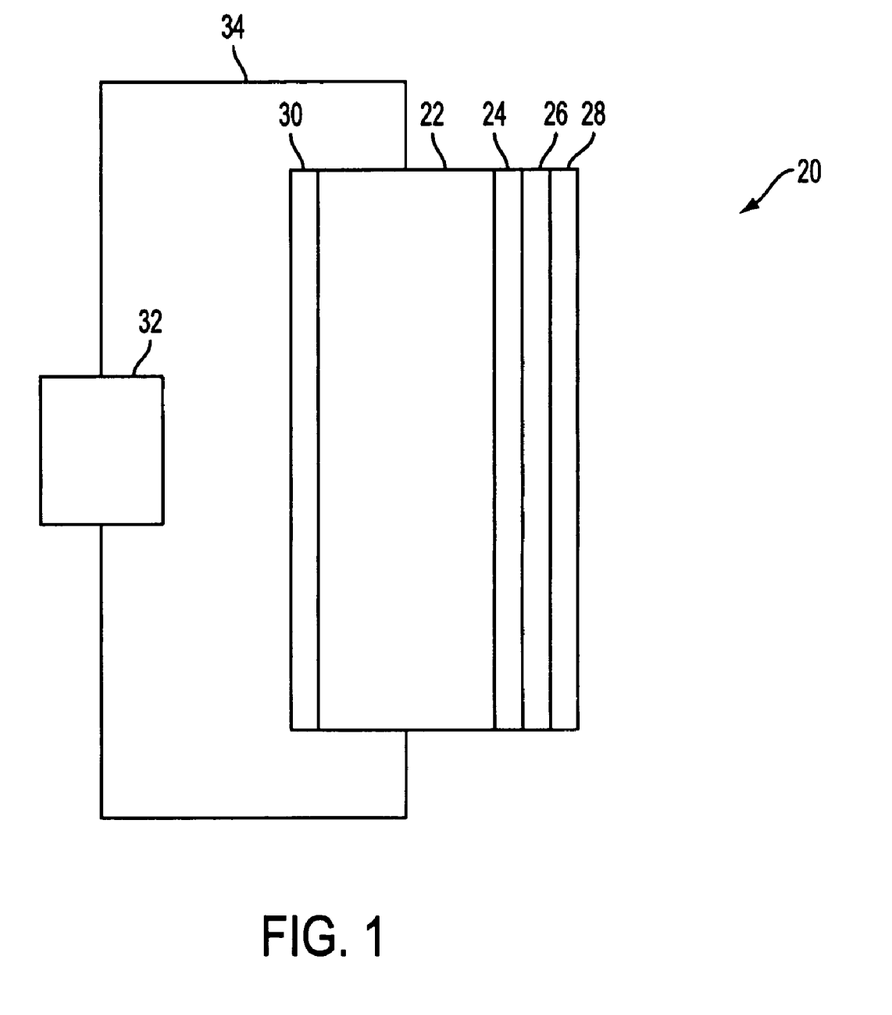
FIG. 1 shows a side view of an embodiment of the present invention.
Figure 3:
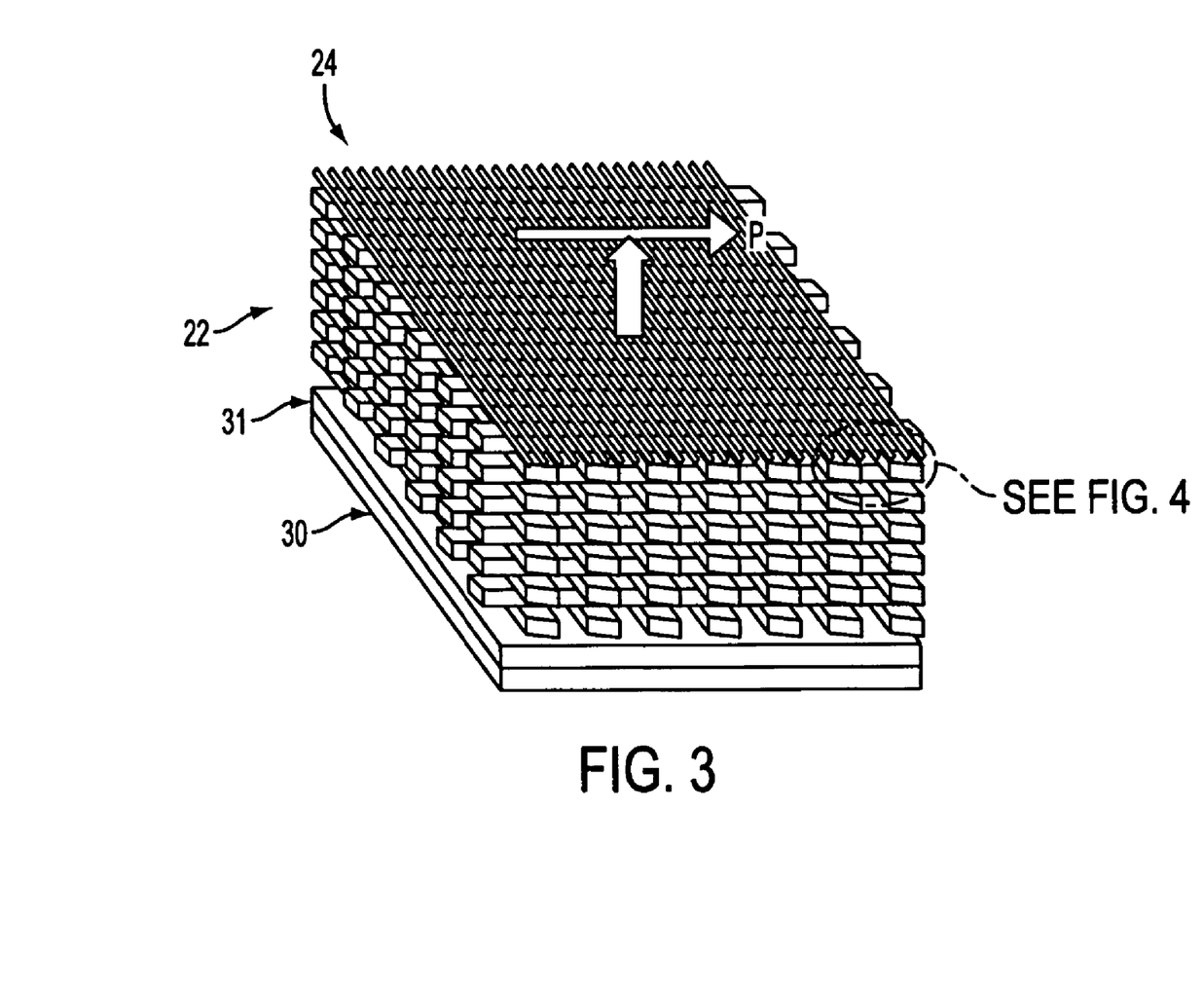
FIG. 3 shows a perspective view of a portion of the photonic crystal emitter 22, wire grid polarizer 24, and reflector 30 as shown in FIG. 1.

Referring now to FIG. 1, a display 20 according to an embodiment of the present invention comprises a photonic crystal that preferable emits light as a photonic crystal emitter 22, a first polarizer 24, a liquid crystal pixel array 26, an analyzer 28, a reflector 30, and a power source 32 connected to the photonic crystal emitter 22 via electrical wires 34. A reflector 30 is preferably attached to a side of the photonic crystal emitter 22 and has a reflecting surface facing the emitter 22, configured to reflect light emitted by the emitter 22. Power source 32 may be any electrical power source presently known, including batteries, a generator, grid power, etc. Of course, the polarizing photonic crystal and/or emitter according to the present invention (as shown in FIG. 3) may be applied to any other application that takes advantage of the polarizing properties of light, including 3D displays, stress analysis, etc.

Photonic crystal emitter 22 is configured to generate light. Light passes through first polarizer 24 where the light is polarized in a P polarization orientation, and light polarized in an S polarization orientation (which is perpendicular to the P polarization orientation) may be absorbed by first polarizer 24, but is preferably reflected back into the photonic crystal 22. In the photonic crystal 22, at least some of the S-polarized light (as reflected back from the first polarizer 24) is randomized and re-emitted in the direction of the first polarizer 24, where the process repeats—i.e., some of the randomized light passes through as P-polarized and the remaining S-polarized light is preferably reflected back into photonic crystal 22 where it is randomized again, and so forth.

P-polarized light from the first polarizer 24 is directed toward pixel array 26. In liquid crystal pixel array 26, each pixel (not shown) is capable of rotating the polarization orientation of photons passing through from (typically) 0° to 90°, depending on an voltage applied to that pixel. Then, light from the pixel array 26 is directed toward second polarizer/analyzer 28, which preferably has a polarization orientation parallel to that of the first polarizer 24. (Alternatively, the polarization orientation of the analyzer 28 may be perpendicular to that of the first polarizer 24.)

Therefore, as the P-polarized light passes through the pixels in pixel array 26 and finally through analyzer 28, each pixel in the pixel array 26 will rotate the polarization orientation of P-polarized photons passing therethrough by a value that depends on applied voltage, so that the photons traveling toward the analyzer 28 are polarized P, S, or somewhere therebetween. When the photons finally pass through the preferably P-polarizing analyzer 28, photons that are P-polarized continue to pass through, while S-polarized photons are absorbed or reflected backward. In this manner, the ratio of P-polarized photons that pass from the first polarizer 24 through a corresponding pixel in the pixel array 26 and finally through the analyzer 28 will, as understood by one of ordinary skill in the art, depend on the polarization rotation angle of that corresponding pixel, ranging from 100% at 0° to 0% at 90° (or vice versa where the polarization orientation of the first polarizer 24 is perpendicular to that of the analyzer 28). Thus, the brightness of each pixel may be adjusted by adjusting the voltage to that pixel. Further, each pixel may effectively comprise three independently adjustable colors (similar to the discussed embodiment, except, e.g., that each pixel may comprise three color filters and three independently voltage-adjustable polarization rotators).

Figure 7:
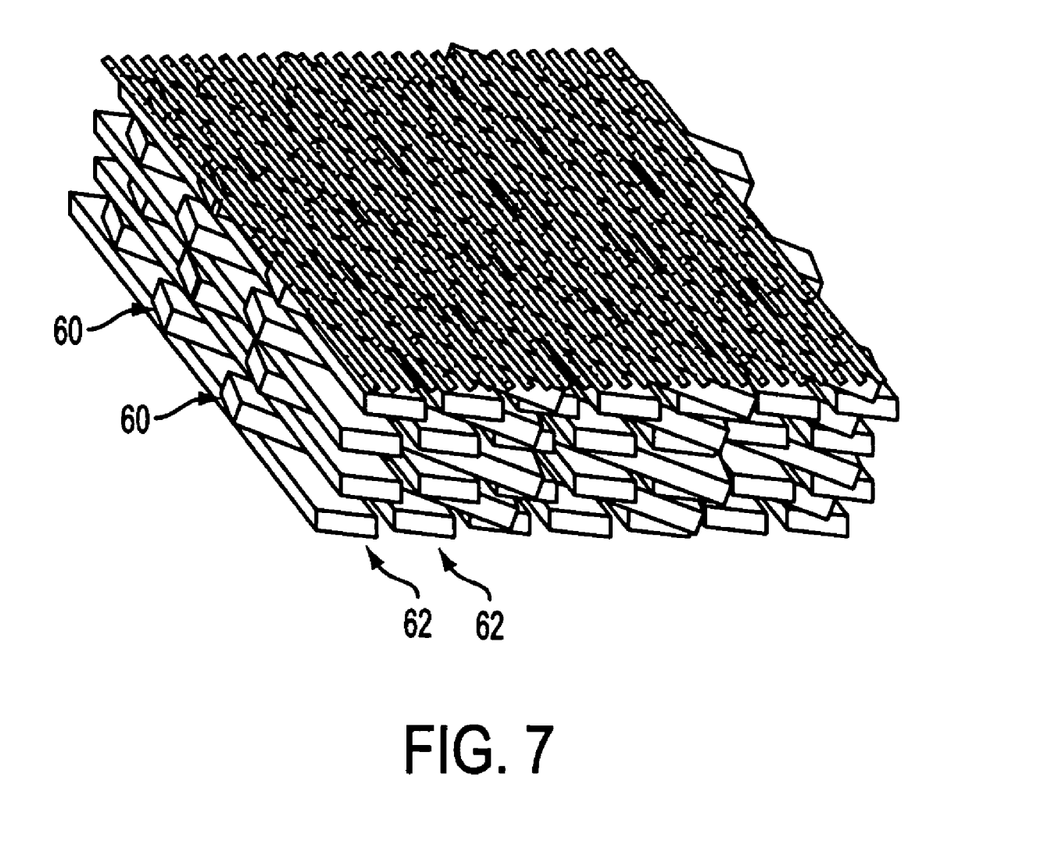
FIG. 7 shows a variation on the embodiment shown in FIG. 3.

The emitter 22, first polarizer 24, and reflector 30 will be further discussed with reference to FIGS. 3 and 4. The emitter 22 may be a metal photonic crystal, comprising, e.g., a series of layers 64, 66, each layer 64, 66 comprising an array of substantially parallel blocks, parallelepipeds, or filaments 60, 62. Further, the filaments 60 in layer 64 are preferably perpendicular to the filaments 62 in layer 66, and so on. However, in another embodiment of the present invention, filaments 60 in one layer may be offset at an angle (i.e., neither parallel nor perpendicular) with respect to filaments 62 in each adjacent layer, as shown in FIG. 7.

The photonic crystal 22 serves as an emitter insofar as at least some of filaments 60, 62 comprise incandescent filaments—i.e., high-temperature filaments that remain solid and structurally intact at a preferred temperature of incandescence. For example, as well known in the art, tungsten remains a stable solid at even white-burning temperatures. Therefore, the photonic crystal emitter 22 may comprise filaments 60, 62 comprising tungsten, aluminum, graphite, and/or any other electrically conductive material. By placing a voltage across the appropriate incandescent filaments 60, 62 via power source 32, a current flows through filaments 60, 62, causing resistive heating of filaments 60, 62 to a temperature at which filaments 60, 62 incandesce a desired electromagnetic energy spectrum. Preferably, the emitter 22 consists entirely of tungsten and/or high-melting-temperature materials, such as $SiO_2$, silicon, a metal, a metal oxide, etc., so that the heat created by filaments 60, 62 does not damage the emitter 22.

The photonic crystal emitter 22 is shown in FIG. 3 comprising twelve layers 64, 66 of filaments 60, 62, respectively, but any number of layers 64, 66 are within the scope of the present invention. Shown at one crystal end surface is first polarizer 24, and at an opposing crystal end surface is reflector 30. The reflector 30 may be any material that is configured to reflect photons emitted from emitter 22 back into emitter 22. For example, the reflector 30 may comprise a reflective coating on the opposing crystal end surface of the emitter 22, the coating comprising a reflecting metal such as silver or aluminum. In another embodiment, an additional quarter wave plate 31 is constructed on top of the reflector 30 so that the polarization of the reflected light is also rotated by 90°.

The emitter 22 is configured to generate light having a wavelength range, such as in the visible spectrum, infrared or longer spectrum, or the ultraviolet or shorter spectrum, such as 400 nm to 700 nm, but may have a peak at a particular wavelength. The emitter 22 is configured at least to generate light having a certain wavelength $\lambda$. The first polarizer 24 may be any type of polarizer, but is a wire grid in one embodiment. The first polarizer 24 is preferably located a distance D from the crystal end surface 84 of the photonic crystal emitter 22 that is not more than about ten wavelengths (or about 10$\lambda$), and is preferably not more than 3$\lambda$, and preferably not more than 1$\lambda$, and preferably approximately ½$\lambda$. The first polarizer 24 is preferably located a distance D from the crystal end surface 84 of the photonic crystal emitter 22 such that the first polarizer 24 quantum mechanically couples with the emitter 22. The wire grid polarizer 24 comprises an array of substantially parallel, closely-spaced electrically conducting wires 68. Preferably, the wires 68 are spaced apart a width W that is substantially less than one wavelength $\lambda$, such as ¼$\lambda$ or less.

Figure 4:
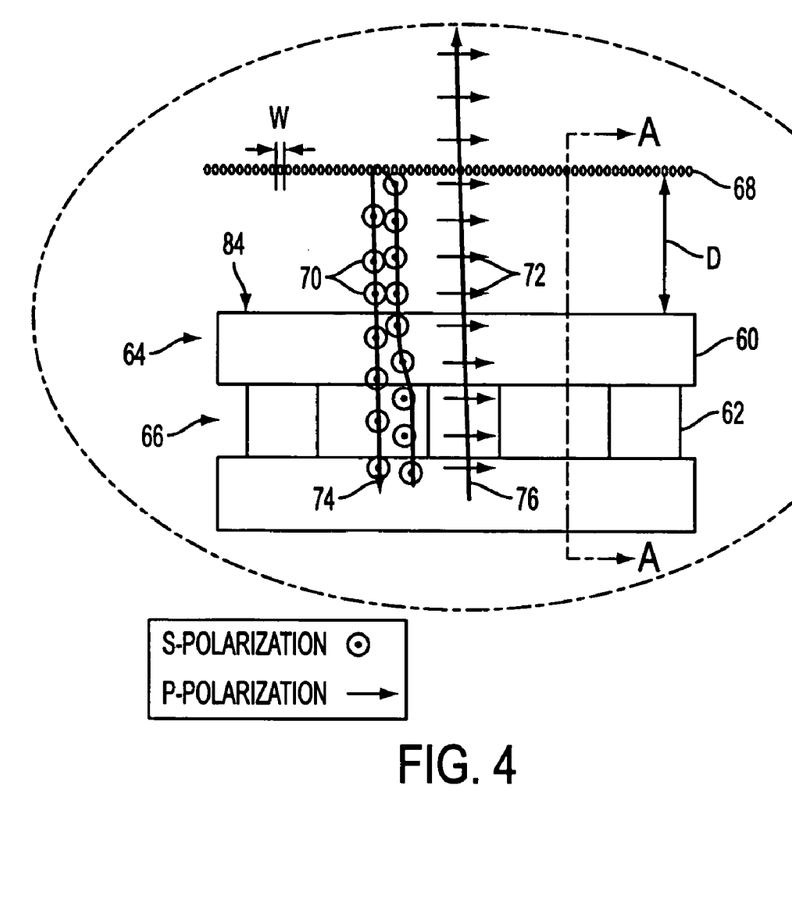
FIG. 4 shows an exploded view of a portion of the photonic crystal emitter 22 and wire grid polarizer 24 as shown in FIG. 3.

Referring now to FIG. 4, the operation of the wire grid polarizer 24 will be explained. As an S-polarized photon 70 moves toward wire grid polarizer 24 (where the wires 68 of the polarizer 24 are parallel to the S-polarization orientation), the photon 70 interacts with the wires 68 and is reflected backward, as shown by the path of arrow 74. However, when a P-polarized photon 72 moves toward wire grid polarizer 24, the photon 72 and polarizer 24 (having perpendicular polarization orientations) do not interact or "see" each other, so that photon 72 passes through polarizer 24 without reflection, as shown by the path of arrow 76.

Figure 5:
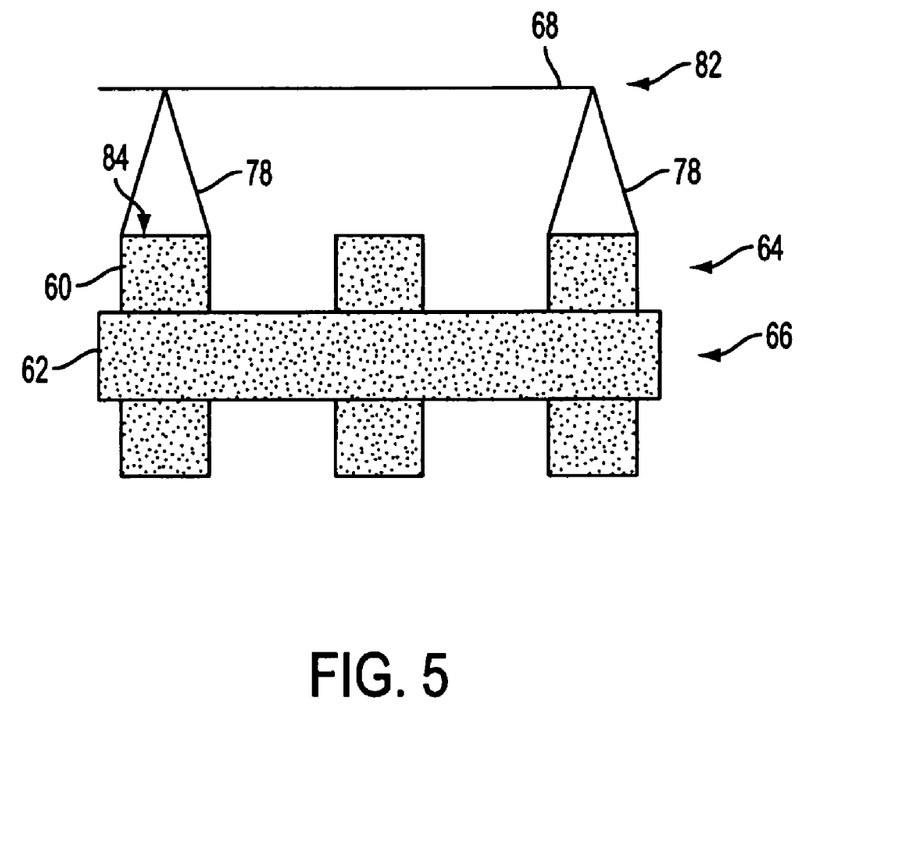
FIG. 5 shows a cross section through section A-A in FIG. 4.

Referring now to FIG. 5, the wire grid polarizer 24 may be connected to the photonic crystal emitter 22 via pillars 78. For example, wires 68 of the polarizer 24 may be freely suspended across two or more pillars 78 so that the wires 68 are freely suspended above the photonic crystal emitter 22 and separated from the crystal end surface 84 of the emitter 22 by aforementioned distance D.

Pillars 78 may, of course, take on any appropriate shape and composition. As shown in FIG. 5, pillars 78 are triangular in cross section, but may be rectangular, circular, etc. They may comprise any material, but preferably a high-temperature material, such as a metal, metal oxide, or other dielectric, including but not limited to $SiO_2$, silicon, graphite, and tungsten. Preferably, ends 82 of wires 68 are connected to at least one pillar 78 so that wires 68 may be stretched over the crystal end surface 84 (separated by distance D). Pillars 78 may be integrally formed with the top layer 64 of the photonic crystal emitter 22, so that the pillars 78 and top layer 64 are formed of the same layer, e.g., of tungsten.

Figure 6:
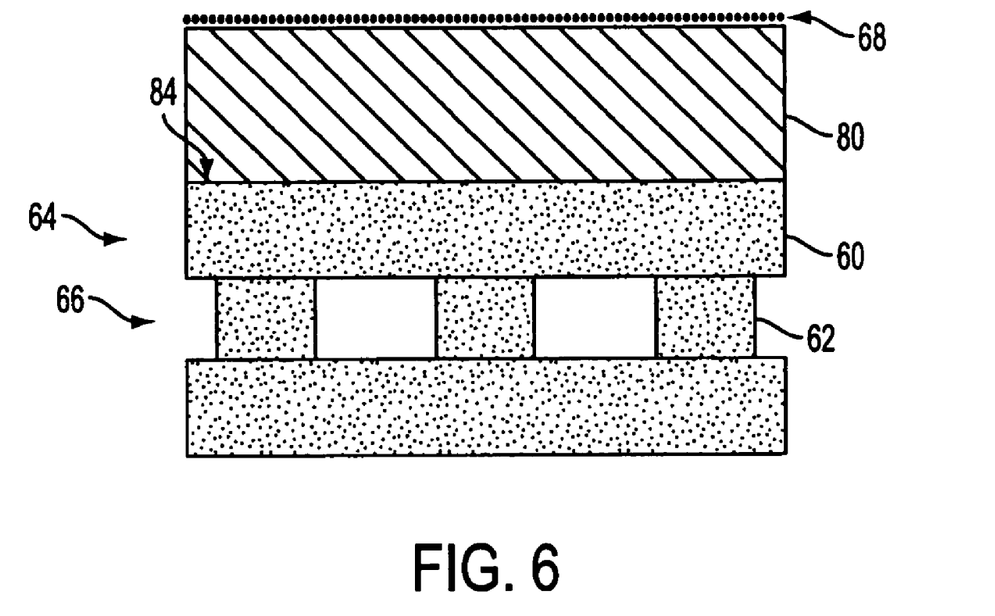
FIG. 6 shows a variation on the embodiment shown in FIG. 4.

Referring now to FIG. 6, which is an alternative embodiment to that shown in FIGS. 5 and 6, wire grid polarizer 24 may be formed as a plurality of conducting wires 68 on the surface of a preferably high-temperature substantially transparent layer 80, such as a dielectric such as sapphire, aluminum oxide, silicon dioxide, aerogel, and so on. Layer 80 may be attached to or otherwise formed directly on the crystal end surface 84 of the emitter 22, and wires 68 may either be attached to or otherwise formed directly on the upper surface of the layer 80. Preferably, the thickness of layer 80 is such as to preserve a separation between the wire grid polarizer 24 and the crystal end surface 84 of distance D.

Figure 2:
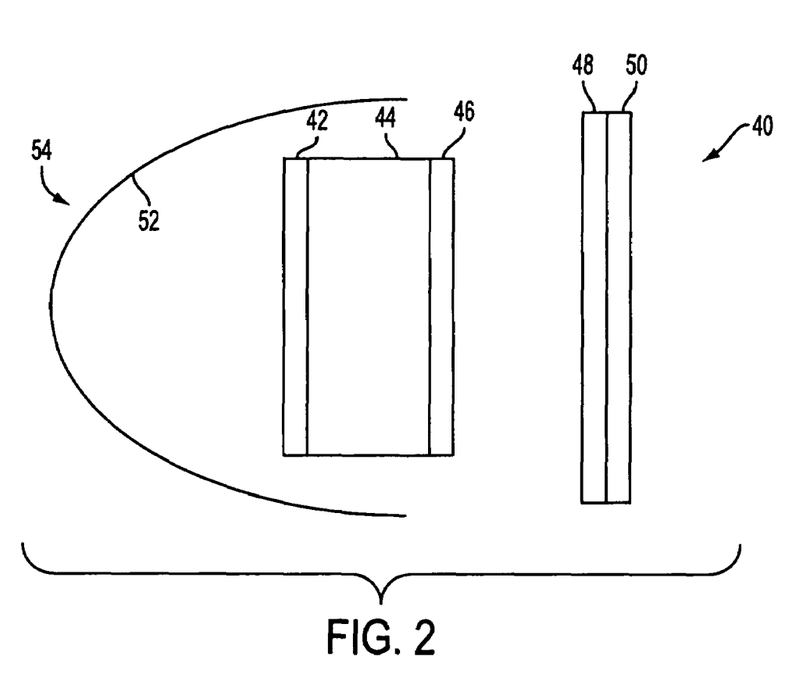
FIG. 2 shows a side view of another embodiment of the present invention.

FIG. 2 shows an alternative embodiment in which a display 40 comprises a photonic crystal emitter 44, first and third polarizers 46, 42, liquid crystal pixel array 48, analyzer (second polarizer) 50, and a parabolic reflector 54 having a reflecting surface 52. The parabolic reflector 54 may be shown out of proportion in FIG. 2. In display 40, photons are emitted from both sides of emitter 44, and are subsequently polarized in preferably the same polarization orientation by first and third polarizers 46, 42. The photons emitted from first polarizer 46 travel to the pixel array 48 and analyzer 50, as discussed with respect to the embodiment in FIG. 1. However, the photons emitted from the third polarizer 42 are reflected by the reflecting surface 52 of parabolic reflector 54 toward the pixel array 48 and analyzer 50.

Photonic crystal emitter 22 and wire grid polarizer 24, as in FIG. 3, may be formed by conventional photolithography techniques, as well as other alternative patterning techniques such as e-beam lithography, holographic lithography, and nano-imprint. Photolithography is well known in the art. For example, a first photonic crystal layer of the emitter 22 may be formed by first depositing a first layer, such as a metal layer comprising tungsten, onto a substrate or reflector 30, etc., such as by chemical vapor deposition (to which tungsten is well suited) or any other deposition method. Next, the first photonic crystal layer may be formed from the first metal layer by one of any number of conventional methods. By way of example and not limitation, a sacrificial resist layer may be deposited on top of the first metal layer. Using a photo mask in conjunction with an appropriate light source, and/or a laser, a desired shape may be carved into the resist layer. Then, the desired shape may be etched into the first metal layer using, e.g., a chemical that is reactive with the first metal layer but not the resist layer. Finally, the remaining portion of the sacrificial resist layer may be removed. Other methods for creating the desired shape for the first photonic crystal layer from the first metal layer are well known in the art. In the case of the photonic crystal emitter 22 shown in FIG. 3, the first photonic crystal layer comprises an array of substantially parallel parallelepipeds or filaments. Subsequent photonic crystal layers may be formed on top of the first photonic crystal layer in a similar manner, so as to form the photonic crystal emitter 22. Further, spaces between the parallel filaments in each photonic crystal layer may be filled, e.g., with a dielectric material.

The wire grid polarizer 24 may be formed on the crystal end surface 84 in a manner similar or substantially identical to formation of subsequent photonic crystal layers, so that the wire grid polarizer 24 is integrally formed with the photonic crystal emitter 22. For example, a tungsten layer may be deposited on the crystal end surface 84, preferably by the same manufacturing machine, and the tungsten layer etched in a similar manner to form the wire grid polarizer 24 directly on the crystal end surface 84. Alternatively or in addition, pillars 78 may be integrally formed on the crystal end surface 84 by a similar or substantially identical step, such as by depositing a layer of material (such as tungsten) and etching the layer to form pillars 78. Subsequently, wire grid polarizer 24 may be formed (possibly integrally) on the pillars 78 so that wires 68 are freely suspended over the crystal end surface 84. Of course, wire grid polarizer 24 and emitter 22 may comprise different materials, but preferably the same material, such as tungsten.

Forming the embodiment shown in FIG. 6 may be similar. For example, instead of a layer corresponding to the material of pillars 78, layer 80 is deposited on the crystal end surface 84 of the emitter 22, and wires 68 of the wire grid polarizer 24 are formed on the upper surface of the layer 80.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described to explain the principles of the invention and as a practical application to enable one skilled in the art to utilize the invention in various embodiments and with various modifications suited to the particular use contemplated. It is intended that the scope of the invention be defined by the claims appended hereto and their equivalents.

What is claimed is:

1. A polarizing photonic band gap system, comprising:
   a polarizer;
   a photonic crystal emitter, connected to said polarizer, having a crystal end surface,
   the photonic crystal emitter configured to generate electromagnetic energy having a wavelength $\lambda$,
   wherein said polarizer has a polarizer surface located within a distance of said crystal end surface sufficient to quantum mechanically couple with said crystal end surface at said wavelength $\lambda$, and
   wherein said photonic crystal emitter has an opposing crystal end surface opposite to said crystal end surface; and
   a reflecting material connected to said opposing crystal end surface of the photonic crystal emitter that is configured to reflect the electromagnetic energy emitted from the photonic crystal emitter back into the photonic crystal emitter.

2. The polarizing photonic band gap system as in claim 1, wherein said polarizer surface is located within a distance of approximately $\lambda$ of said crystal end surface.

3. The polarizing photonic band gap system as in claim 1, wherein said polarizer surface is located a distance of approximately $\frac{1}{2}\lambda$ from said crystal end surface.

4. The polarizing photonic band gap system as in claim 1, wherein said polarizer comprises a wire grid, said wire grid comprising an array of substantially parallel electrically conducting wires, wherein adjacent wires of said conducting wires are spaced apart by a distance of substantially less than $\lambda$.

5. The polarizing photonic band gap system as in claim 4, wherein said wire grid is formed on a high-temperature, substantially transparent dielectric material.

6. The polarizing photonic band gap system as in claim 5, wherein said dielectric material comprises at least one of sapphire, aluminum oxide, and silicon dioxide.

7. The polarizing photonic band gap system as in claim 4, wherein said conducting wires are freely suspended over said crystal end surface.

8. The polarizing photonic band gap system as in claim 7, wherein said freely suspended conducting wires are supported at their respective ends on pillars connected to said photonic crystal emitter.

9. The polarizing photonic band gap system as in claim 1, wherein said photonic crystal emitter comprises a metal.

10. The polarizing photonic band gap system as in claim 9, wherein said photonic crystal emitter comprises metal incandescent filaments, whereby said photonic crystal emitter is configured to generate incandescent light by application of a current through said incandescent filaments.

11. The polarizing photonic band gap system as in claim 10, wherein said photonic crystal emitter comprises a plurality of layers of metal incandescent filaments, wherein the filaments in each individual layer are substantially parallel.

12. The polarizing photonic band gap system as in claim 11, wherein the filaments in adjacent layers are substantially perpendicular.

13. The polarizing photonic band gap system as in claim 11, wherein the filaments in adjacent layers are substantially non-perpendicular.

14. The polarizing photonic band gap system as in claim 10, wherein said incandescent filaments comprise tungsten.

15. The polarizing photonic band gap system as in claim 10, wherein said polarizer comprises a wire grid, said wire grid comprising an array of substantially parallel electrically conducting wires, wherein adjacent wires of said conducting wires are spaced apart by a distance of substantially less than $\lambda$.

16. The polarizing photonic band gap system as in claim 15, wherein said conducting wires and said incandescent filaments comprise tungsten.

17. The polarizing photonic band gap system as in claim 15, wherein said wire grid is integrally formed with said photonic crystal emitter.

18. The polarizing photonic band gap system as in claim 15, wherein said photonic crystal emitter has an opposing crystal end surface opposite to said crystal end surface, wherein said system further comprises a reflecting material connected to said opposing crystal end surface.

19. The polarizing photonic band gap system as in claim 18, wherein said wire grid is located within a distance of approximately $\lambda$ of said crystal end surface.

20. A display, comprising:
the polarizing photonic band gap system as in claim 18
a second polarizer; and
a pixel array located between the polarizing photonic band gap system and the second polarizer.

21. The polarizing photonic band gap system as in claim 1, wherein said photonic crystal emitter has an opposing crystal end surface opposite to said crystal end surface, wherein said system further comprises:
a second polarizer connected to said photonic crystal emitter and having a second polarizer surface located within a distance of said opposing crystal end surface sufficient to quantum mechanically couple to said opposing crystal end surface at said wavelength $\lambda$.

22. The polarizing photonic band gap system as in claim 21, further comprising a reflector configured to reflect light polarized by said second polarizer.

23. The polarizing photonic band gap system as in claim 1, wherein said photonic crystal emitter comprises an opposing crystal end surface opposite to said crystal end surface, wherein said system further comprises a quarterwave plate and a reflecting material connected to said opposing crystal end surface.

24. The polarizing photonic band gap system as in claim 1, wherein the polarizer is connected to said photonic crystal emitter via a high-temperature, substantially transparent dielectric material.

25. The polarizing photonic band gap system as in claim 1, wherein $\lambda$ is in a visible spectrum.

26. A polarizing photonic band gap system, comprising:
a wire grid polarizer, said wire grid comprising an array of substantially parallel electrically conducting wires, wherein adjacent wires of said conducting wires are spaced apart by a distance of substantially less than $\lambda$;
a photonic crystal emitter, connected to said wire grid polarizer, comprising metal incandescent filaments, whereby said photonic crystal emitter is configured to generate visible incandescent light having a wavelength $\lambda$; and
a reflecting material connected to an opposing crystal end surface of the photonic crystal emitter wherein the reflecting material is configured to reflect the visible incandescent light emitted by the photonic crystal emitter back into the photonic crystal emitter.

27. The polarizing photonic band gap system as in claim 26, wherein said incandescent filaments and said conducting wires comprise tungsten.

28. The polarizing photonic band gap system as in claim 26, wherein said wire grid is integrally formed with said photonic crystal emitter.

29. The polarizing photonic band gap system as in claim 26, wherein the polarizer is connected to said photonic crystal emitter via a high-temperature, substantially transparent dielectric material.

30. The polarizing photonic band gap system as in claim 26, wherein said conducting wires are freely suspended over said crystal end surface.

31. A display, comprising:
the polarizing photonic band gap system as in claim 26;
a second polarizer; and
a pixel array located between the polarizing photonic band gap system and the second polarizer.

32. A polarizing photonic band gap system, comprising:
means for polarizing electromagnetic energy;
means for generating electromagnetic energy, connected to said means for polarizing electromagnetic energy, having a wavelength $\lambda$ in a photonic crystal, the means for generating electromagnetic energy having a crystal end surface;
wherein said means for polarizing electromagnetic energy has a polarizer surface located within a distance of said crystal end surface sufficient to quantum mechanically couple with said crystal end surface at said wavelength $\lambda$, and
wherein said means for generating electromagnetic energy has an opposing crystal end surface opposite to said crystal end surface; and
a means for reflecting electromagnetic energy connected to said opposing crystal end surface of said means for generating electromagnetic energy that is configured to reflect the electromagnetic energy emitted from the means for generating electromagnetic energy back into the means for generating electromagnetic energy.

33. The polarizing photonic band gap system as in claim 32, wherein said means for generating electromagnetic energy has an opposing crystal end surface opposite to said crystal end surface, wherein said system further comprises:
a second means for polarizing electromagnetic energy connected to said means for generating electromagnetic energy and having a second polarizer surface located within a distance of said opposing crystal end surface sufficient to quantum mechanically couple to said opposing crystal end surface at said wavelength $\lambda$.

* * * * *

UNITED STATES PATENT AND TRADEMARK OFFICE
CERTIFICATE OF CORRECTION

PATENT NO. : 7,378,785 B2 Page 1 of 1
APPLICATION NO. : 10/819158
DATED : May 27, 2008
INVENTOR(S) : Chien-Hua Chen et al.

It is certified that error appears in the above-identified patent and that said Letters Patent is hereby corrected as shown below:

In column 7, line 34, in Claim 20, after "claim 18" insert -- ; --.

Signed and Sealed this

Thirtieth Day of September, 2008

JON W. DUDAS
*Director of the United States Patent and Trademark Office*